United States Patent
Seki et al.

(10) Patent No.: US 7,035,264 B2
(45) Date of Patent: Apr. 25, 2006

(54) COMMUNICATION NETWORK SYSTEM AND METHOD FOR SYNCHRONOUSLY CONTROLLING PATH CONNECTION

(75) Inventors: Takashi Seki, Yokohama (JP); Yoshihiro Ashi, Yokohama (JP); Takaaki Toyama, Fujisawa (JP); Yasuo Murakami, Yokohama (JP); Kenichirou Tomizawa, Yokohama (JP); Masao Nakayama, Yokohama (JP); Kouichi Asao, Yokohama (JP); Taichi Hiramatsu, Soka (JP); Shuuichi Maruyama, Higashimurayama (JP)

(73) Assignee: Hitachi, Ltd., Tokyo (JP)

( * ) Notice: Subject to any disclaimer, the term of this patent is extended or adjusted under 35 U.S.C. 154(b) by 838 days.

(21) Appl. No.: 09/796,615

(22) Filed: Mar. 2, 2001

(65) Prior Publication Data

US 2004/0213247 A1   Oct. 28, 2004

(30) Foreign Application Priority Data

Sep. 11, 2000   (JP)   ............................. 2000-280145

(51) Int. Cl.
   *H04L 12/28*   (2006.01)
(52) U.S. Cl. ................... 370/395.4; 370/395.2; 370/468
(58) Field of Classification Search ............ 370/395.1, 370/395.2, 395.3, 395.31, 395.4, 397, 399, 370/468
   See application file for complete search history.

(56) References Cited

U.S. PATENT DOCUMENTS

| 5,745,694 | A  | * | 4/1998  | Egawa et al. ................ 709/225 |
| 6,091,727 | A  | * | 7/2000  | Han et al. .............. 370/395.21 |
| 6,118,762 | A  | * | 9/2000  | Nomura et al. ............. 370/230 |
| 6,226,263 | B1 | * | 5/2001  | Iwase et al. ................ 370/231 |
| 6,377,579 | B1 | * | 4/2002  | Ofek ....................... 370/395.4 |
| 6,771,661 | B1 | * | 8/2004  | Chawla et al. ............. 370/468 |
| 6,801,513 | B1 | * | 10/2004 | Gibbons et al. ............ 370/337 |

OTHER PUBLICATIONS

Japanese Unexamined Patent Publication No. 07-154392.
Japanese Unexamined Patent Publication No. 10-173662.

* cited by examiner

*Primary Examiner*—Ricky Ngo
*Assistant Examiner*—Christine Ng
(74) *Attorney, Agent, or Firm*—Mattingly, Stanger, Malur & Brundidge, P.C.

(57) ABSTRACT

An ATM network for synchronously perform a path connection control at a plurality of nodes, wherein path control data are preliminarily supplied to the nodes from a network management system before a designated operation time. Each node generates a current time synchronously with a network synchronous clock, selects path control data by comparing the designated operation time of the control data with the current time, and autonomously executes a path connection control in accordance with the selected path control data.

7 Claims, 14 Drawing Sheets

FIG. 4

| DESTINATION STATION | NEXT NODE | INGRESS PATH DEFINITION | | EGRESS PATH DEFINITION | | |
|---|---|---|---|---|---|---|
| | | INPUT PORT NO. | INPUT VPI/VCI | OUTPUT PORT NO. | OUTPUT VPI/VCI | INPUT PORT NO. OF NEXT NODE |
| A | — | — | — | No. [Pa1] | — | — |
| B | B | No. [Pa1] | XX···/XX···1 | No. [Pa2] | YY···/YY···1 | No. [Pb2] |
| C | B | No. [Pa1] | XX···/XX···2 | No. [Pa2] | YY···/YY···2 | |
| D | D | No. [Pa1] | XX···/XX···3 | No. [Pa3] | YY···/YY···3 | No. [Pd2] |
| ... | | | | | | |

Applied Node: A (150A)

150A-1, 150A-2, 150A-3, 150A-4
151, 152, 153, 153a, 153b, 154, 154a, 154b, 154c
150B, 150N

COMMUNICATION NETWORK SYSTEM AND METHOD FOR SYNCHRONOUSLY CONTROLLING PATH CONNECTION

BACKGROUND OF THE INVENTION (1) Field of the Invention

The present invention relates to a communication network system and a method for synchronously controlling path connection. More particularly, the invention relates to a communication network system, an ATM node, and a method for synchronously controlling path connection for instantaneously controlling path connection at a predesignated time.

(2) Description of the Related Art

In an ATM (Asynchronous Transfer Mode) communication network, communications are conducted among terminals in a form that a plurality of communication paths (virtual paths or virtual connections) are multiplexed on a physical line connecting nodes.

In the ATM communication field, a technique of automatically switching a communication path in which a failure occurs to another communication path detouring the failure position is known. There is the upper limit in the transmission capability (bandwidth) of a connection line between nodes. When an idle bandwidth is narrow, the communication path cannot be established in a bandwidth desired by the user. Consequently, a technique of reserving a bandwidth while designating a communication start time in advance and automatically assuring the bandwidth at the reserved time is known.

For example, Japanese Unexamined Patent Application No. 7-154392 proposes a path bandwidth setting method. According to the method, a node which receives a bandwidth reservation from a user terminal issues a reservation request to a bandwidth managing unit, and the bandwidth managing unit determines whether the reservation is acceptable or not. When the reservation is acceptable, a reserved bandwidth of the path and reserved time are stored as bandwidth management information. At the reserved time, a bandwidth change is notified to nodes at both ends of the path.

In a bandwidth reservation control system proposed in Japanese Unexamined Patent Application No. 10-173662, a bandwidth reservation request in which a communication destination terminal, a bandwidth, scheduled communication start and end times, and a reservation class are designated is issued from a terminal to a network managing system. The reservation class includes a preferential reservation for immediately assuring a bandwidth and a normal reservation of attempting assurance of a bandwidth at the scheduled communication start time. When the bandwidth reservation request is received from the terminal, in the case of the normal reservation, the network managing system performs a reservation registering process and, at the scheduled communication start time, starts a route determining process capable of assuring the bandwidth. In the case of the preferential reservation, on receipt of the bandwidth reservation request, the route determining process is immediately performed. After determining a route having the user-designated bandwidth, a bandwidth assuring process is executed. The bandwidth assurance in this case means a state that, although a connection to an ATM switch has not be established, the bandwidth cannot be used by other request calls. The connection to the ATM switch is established at the scheduled communication start time.

In the conventional path bandwidth control for designating a communication start time (reserved time) and automatically setting a path, a network management system issues a control instruction for setting a path to nodes positioned at both ends of a reserved path or each of nodes on a reserved path at the reserved time. A delay in time occurs in a period from the issuance of the control instruction to completion of an actual path setting operation performed by each of the nodes. A plurality of nodes therefore cannot set paths instantaneously at the reserved time.

Assuming now that, for example, a digital TV relay network for connecting broadcasting stations in major cities in a country via an ATM network is constructed in order to relay a TV program produced by one of the stations to other stations via the ATM network, and to simultaneously broadcast the program by the plurality of stations, frequent switching the source stations are required in accordance with a scheduled TV program table in each broadcasting station. In this case, a plurality of nodes on the ATM network connecting the broadcasting stations have to instantaneously set or release paths at a predesignated time synchronously with each other.

SUMMARY OF THE INVENTION

An object of the invention is to provide a method for synchronously controlling path connection and a communication network system in which a plurality of nodes can change communication paths synchronously with each other.

Another object of the invention is to provide a method for synchronously controlling path connection and a communication network system in which a plurality of nodes can achieve a path connection control instantaneously at a predesignated time.

Further another object of the invention is to provide an ATM node and an ATM switch capable of setting or releasing a path at a predesignated time.

Further another object of the invention is to provide a digital TV relay network in which a plurality of broadcasting stations are connected via an ATM network and a configuration of a connection path between broadcasting stations can be instantaneously changed at a predesignated time in accordance with TV programs.

In order to achieve the objects, the invention is characterized in that a plurality of nodes forming a reserved path in an ATM network parallelly, autonomously execute a path connection control at a predesignated time.

In order to realize the parallel path connection control by the plurality of nodes, in the invention, the path control information is supplied in advance to the plurality of nodes before the designated time. Each of the nodes selects the path control information of which designated time has reached the current time, and sets or release the path. To allow the plurality of nodes to execute the path connecting control synchronously with each other at the designated time, in the invention, each of the nodes has a timer for indicating the current time synchronously with network synchronous clocks, compares a scheduled execution time (reserved time) indicated by the path control information with the current time, and selects the path control information of which designated time has reached the current time.

More specifically, an ATM node and an ATM switch of the invention has a plurality of input line interfaces and a node control unit connected to the input line interfaces. The node control unit has means for storing a group of path control information of which execution times are within a predetermined period, and means for selectively loading the path control information with execution time in a predetermined time hence among the path control information to an input line interface corresponding to the path control information. The input line interface which receives the path control information has means for selectively switching the header conversion information of input ATM cells to the designated contents at an execution time designated by each path control information.

The input line interface has, for example, means for converting header information of input ATM cells, means for storing path control information supplied from the node control unit, and timer means for indicating a current time synchronously with a network synchronous clock. The switching means selectively switches header conversion information of the input ATM cells to designated contents at a designated time on the basis of the current time indicated by the timer means and the execution reserved time indicated by the path control information.

In a preferred embodiment of the invention, each of the input line interfaces has first and second header conversion tables and control means for switching header conversion information in predetermined processing cycles. The control means switches a table used for converting the header of input ATM cells from the first header conversion table to the second header conversion table of which contents have been updated in the previous processing cycle, updates the contents of the first header conversion table to those of the second header conversion table, after that, switches the second header conversion table to the first header conversion table, and updates the contents of the second header conversion table on the basis of path control information having a designated time which becomes equal to the current time in the next processing cycle.

A communication network system of the invention includes a plurality of nodes constructing an ATM network; a network management system connected to the plurality of nodes via a data communication network; and a plurality of terminal apparatuses for transmitting path connection control reservation information designating a path to be controlled, control operation, and execution time, to the network management system. The network management system has means for generating path control information for each node located on a path indicated by the reservation information on the basis of network configuration information and the path connection control reservation information received from the terminal apparatus, and means for distributing the path control information with execution time being in a predetermined period in a lump to a corresponding node. Each of the nodes has means for storing the path control information distributed in advance from the network management system, timer means for operating synchronously with a network synchronous clock of the data communication network, and means for comparing a current time indicated by the timer with the execution time indicated by each of the path control information and executing a designated path connection controlling operation at a designated time.

According to the invention, a method for controlling path connection in a communication network system including: a plurality of nodes constructing an ATM network; a network management system connected to the plurality of nodes via a data communication network; and a plurality of terminal apparatuses connected to the data communication network, comprising the steps of: transmitting path connection control reservation information designating a path to be controlled, control operation, and execution time, from any of the terminal apparatuses to the network management system; generating path control information for each node located on a designated path on the basis of the path connection control reservation information for each path received from the terminal apparatus and distributing the path control information with execution time being in a predetermined period in a lump to a corresponding node by the network management system; and storing the path control information distributed in advance from the network management system and executing a designated path connection controlling operation at a designated time by each of the nodes.

BRIEF DESCRIPTION OF THE DRAWINGS

FIG. 4 is a diagram showing an example of a path definition table 150 stored in a network configuration information file 15 in the network management system 10.

DESCRIPTION OF THE PREFERRED EMBODIMENTS

Embodiments of the invention will be described in detail hereinbelow with reference to the drawings.

Figure 1:
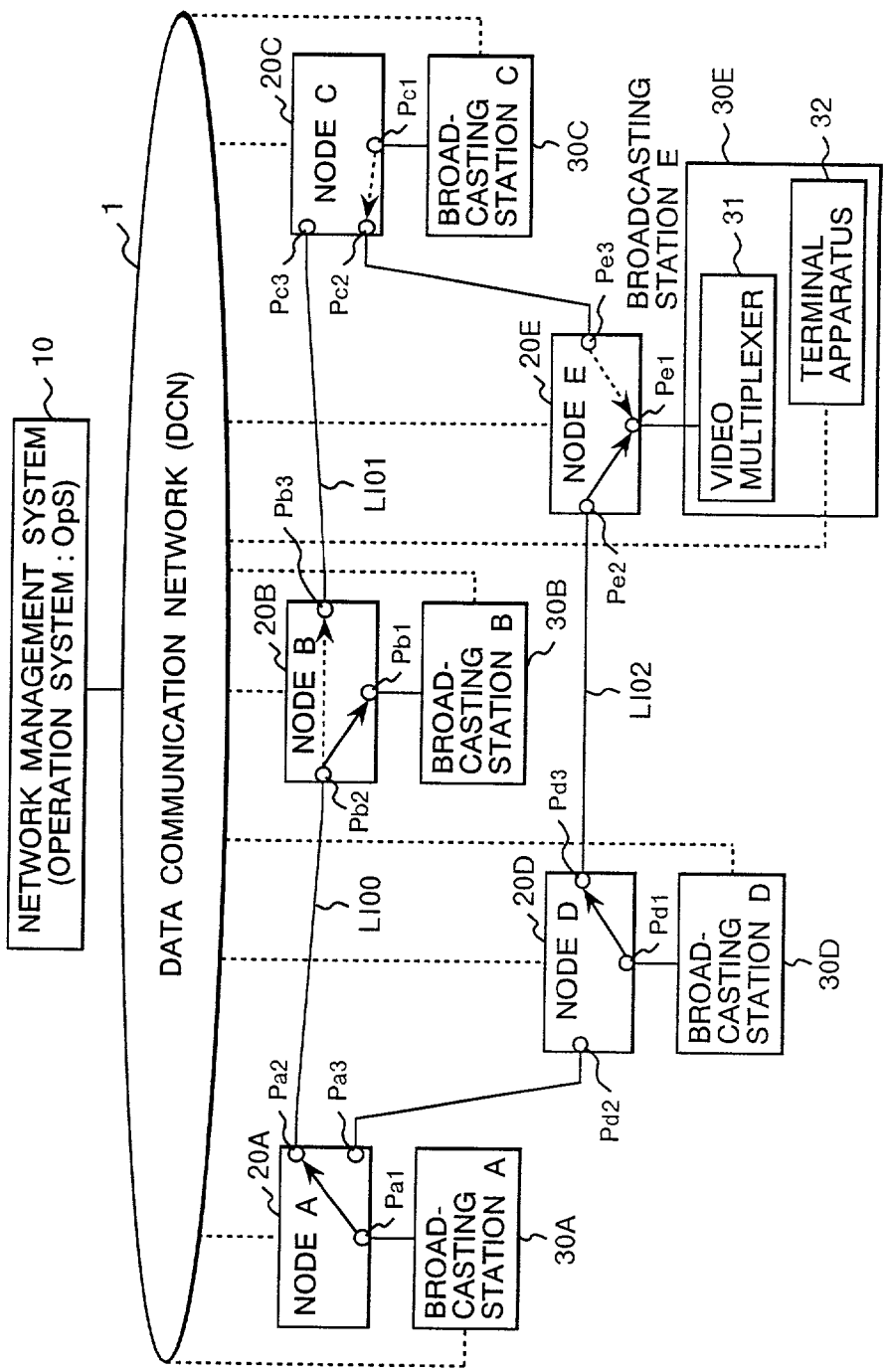
FIG. 1 is a diagram showing a network configuration of a digital TV relay network to which the invention is applied.

FIG. 1 shows the configuration of a digital TV relay network as an example of a communication network to which the invention is applied. The network has an ATM communication network connecting a plurality of nodes 20

(20A to 20D) and a data communication network (DCN) 100 for connecting the nodes to a network management system (operations system: OpS) 10.

In the embodiment, by connecting broadcasting stations 30 (30A to 30E) in major cities in a country to the nodes 20 (20A to 20D), the ATM network is used as a relay network (distribution network) of digital TV video signals. Each of the broadcasting stations, for example, a broadcasting station 30E has a video multiplexer 31 and a terminal apparatus 32. By accommodating the video multiplexer 31 in a specific input/output port of the node 20, video signals produced by the station itself can be distributed to other stations and video signals produced by other stations can be received by the station.

For example, in the case of distributing a TV video signal produced by the broadcasting station 30A to the broadcasting station 30B, in the node 20A in which the station 30A is accommodated, the TV video signal supplied from the station 30A to a connection port Pa1 is relayed to a port Pa2 so that the TV Video signal is transmitted to the node 20B via a line L100. In the node 20B accommodating the station 30B, the video signal supplied from the line L100 to a port Pb2 is relayed to a port Pb1 connected with the station 30B. In such a manner, the TV video signal being broadcasted by the broadcasting station 30A can be simultaneously broadcasted by the broadcasting station 30B.

In the case of distributing the TV video signal produced by the broadcasting station 30A to the broadcasting station 30C, the node 20B may operate to relay an input video signal from the port Pb2 to a port Pb3 and transfer the input video signal to the node 20C via a line L101. In the case of switching a video signal received from the broadcasting station 30D via a line L102 to a video signal produced by the broadcasting station 30C in the broadcasting station 30E, the node 20E accommodating the broadcasting station 30E may operate so as to switch the input port of a video signal toward a connection port Pe1 to which the station E is connected, from a connection port Pe2 of the line L102 to a connection port Pe3 of a line L103.

In the broadcasting system using the ATM network as a video relay network among stations as described above, in order to broadcast a TV video signal in accordance with a program predetermined in each of the broadcasting stations 30 in places in all over the country, a plurality of nodes constructing the ATM network have to instantaneously perform an operation of setting (connecting), releasing (disconnecting), or switching a path at a designated time synchronously with each other.

In the invention, to realize instantaneous switching of a video distributing path by the plurality of nodes, the terminal apparatus 32 for path control reservation installed in each broadcasting station 30 is connected to the network management system 10 via the data communication network 100, a time at which the switching is to be executed (hereinbelow, called reserved time) is designated from each terminal apparatus 32 to the network management system 10 to reserve a connection control (setting or releasing of a path) among specific broadcasting stations. In accordance with connection control reservation information received from each of the terminal apparatuses, the network management system 10 generates path control information of a predetermined period for each of the nodes on the ATM network, and periodically distributes the information to each of the nodes 20 via the data communication network 100. The path control information of, for example, one day may be distributed at a scheduled time every morning. In order to reduce an information amount to be stored in each node, the path control information of a few hours may be distributed each time.

Each of the nodes 20 has a timer for indicating the current time synchronously with the other nodes 20 in accordance with synchronous clocks of the data communication network 100 or ATM network, selects the path control information having the due designated time among the path control information distributed from the network management system 10, and executes an operation of connecting, disconnecting, or switching the designated path at the designated time.

In order to simplify the drawing, only three ports are shown per node 20 in FIG. 1. However, each node may be comprised of an ATM switch having a number of input/output ports for accommodating general terminals other than the above-described broadcasting station equipment, and an inter-station connecting line.

Figure 2:
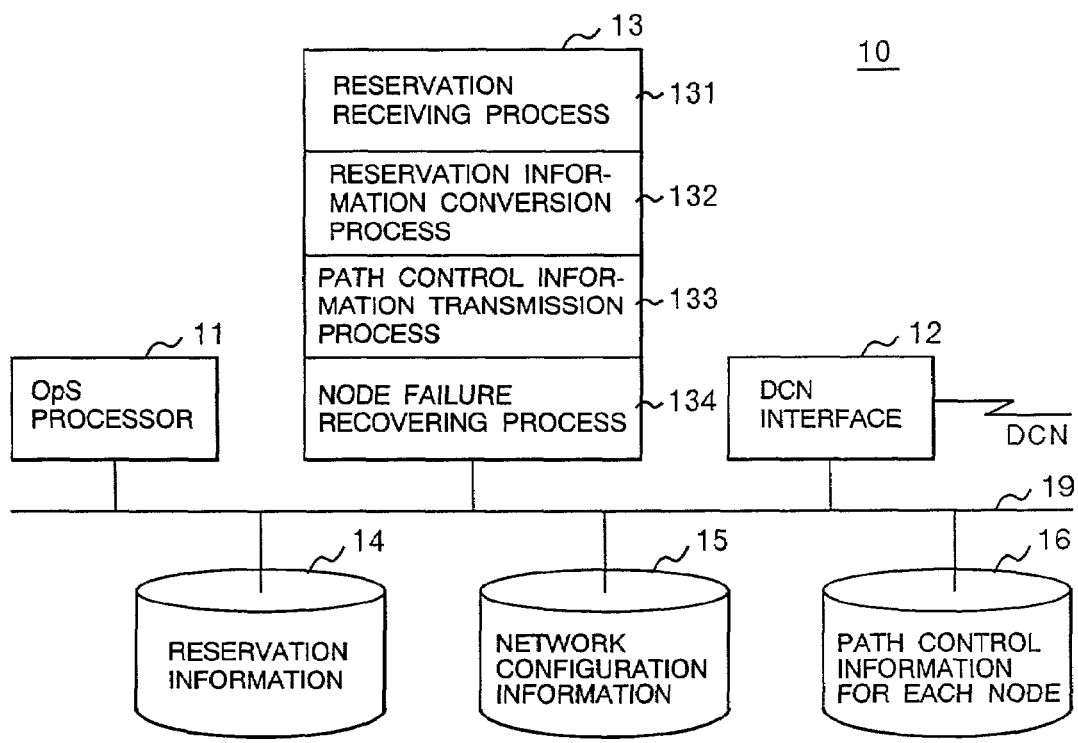
FIG. 2 is a diagram showing the configuration of a network management system 10 in FIG. 1.

FIG. 2 shows the configuration of the network management system (OpS) 10 in FIG. 1.

The network management system 10 has a processor (OpS processor) 11, a DCN interface 12 for connection to the data communication network 100, a program memory 13 in which various programs necessary for controlling a connection among the broadcasting stations are stored, a reservation information file 14, a network configuration information file 15, a path control information file 16 for each node, and a bus 19 connecting those elements.

Programs prepared in the program memory 13 are, for example: a reservation receiving process routine 131 for receiving a reservation of an inter-station connection control from the terminal apparatus 32 of each broadcasting station and storing connection control reservation information into the reservation information file 14; a reservation information conversion process routine 132 for reading out the connection control reservation information (hereinbelow, simply referred to as reservation information) having a reservation time in a specific period from the reservation information file 14, developing the reservation information to path control information for each node with reference to the network configuration information file 15, and storing the path control information into the file 16; a path control information transmission process routine 133 for periodically transmitting the path control information for each node stored in the file 16 to each node 20; and a node failure recovering process routine 134 for retransmitting path control information on recovery from a failure when the path control information already distributed to a specific node is lost due to the failure in the node.

Figure 3:
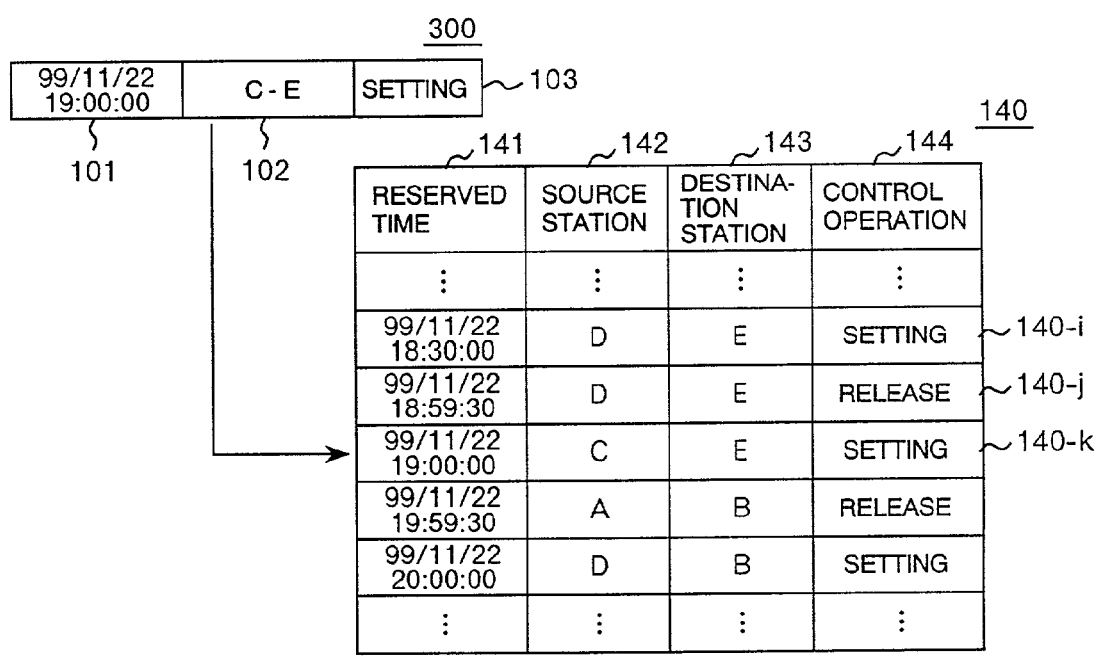
FIG. 3 is a diagram for explaining the relation between a path control information entry 300 and a reservation table 140 formed in a reservation information file 14 in the network management system 10.

The person in charge of scheduling TV programs in each broadcasting station operates the terminal apparatus 32 to issue a reservation request 300 which designates, for example, as shown in FIG. 3, a reserved time 101, definition information 102 of a path to be controlled (source station and destination station), and the kind of path control operation 103. In the embodiment, "setting (connection)" and "release (disconnection)" are prepared as the kind of path control operation 103. For example, in the case of switching a path A to a path B at a certain reserved time, a reservation request for instructing disconnection of the existing path A at the reserved time and a reservation request for instructing setting of the new path B at the same time are generated separately from the terminal apparatus 32. Each of the reservation requests 300 is transmitted in a message format in conformity with the DCN protocol to the network management system 10.

When the reservation request messages are received from the broadcasting stations, the OpS processor 11 in the network management system 10 executes the reservation receiving process routine 131, thereby sorting reservation information extracted from the reservation requests 300 in accordance with the reserved time and storing the reservation information in the reservation information file 14, for example, in an entry format shown in a reservation table 140 in FIG. 3.

In the network configuration information file 15 to which the reservation information conversion process routine 132 refers, for example, as shown in FIG. 4, a plurality of path definition tables 150 (150A to 150N) are prepared in correspondence with the nodes.

In the embodiment, the path definition table 150 stores a plurality of entries each showing the correspondence relations of a destination station 151 of the path, a next node 152, ingress path definition information 153, and egress path definition information 154. The ingress path definition information 153 includes number 153a of an input port to which ATM cells from a broadcasting station (hereinbelow, called a home broadcasting station) accommodated in a node as a target of application of each table are inputted, and input VPI/VCI 153b attached to the header of the input ATM cells. The output path definition information 154 includes number 154a of an output port of the ATM cells, output VPI/VCI 154b to be attached to each of the output ATM cells, and next node input port number 154c indicative of an input port of the output ATM cells at the next node.

On the condition of using the ATM network shown in FIG. 1, for example, in the path definition table 150A in which the node 20A using the station 30A as a home broadcasting station is an applied node, as shown in FIG. 4, the stations B, B, and D are defined as the next nodes 152 corresponding to the destination stations B, C, and D, respectively. Since the destination station A is at a terminating end of the path for the node 20A, as shown in an entry 150A-1, the next node corresponding to the destination station A does not exist. The output port number is the number "No. [Pa1]" of the connection port Pa1 for the home broadcasting station 30A.

In the ATM network of FIG. 1, for example, in order to set a path from the station 30A to the station 30C, path control instructions have to be issued from the network management system 10 to the nodes 20A, 20B, and 20C so that the following operations are performed with respect to ATM cells transmitted from the station 30A. The source node 20A executes cell header conversion (rewriting of VPI/VCI) process in accordance with the output path definition information shown by an entry 150A-3 in the path definition table 150A and relays the ATM cell to the output port Pa2. The next node 20B executes the header conversion according to the output path definition information of the entry corresponding to the destination station C in the path definition table 150B and, after that, outputs the resultant ATM cell to the output port Pb3. The further next node 20C outputs the reception cell to the output port Pc1 in accordance with the output path definition information of the entry corresponding to the destination station C in the path definition table 150C.

In the invention, in place of giving an instruction of switching a header conversion table from the network management system 10 to each of the nodes to which the target path is related at each reserved time, the network management system 10 executes the reservation information conversion process routine 132 periodically (for example, once at a fixed time every day or every few hours), converts the reserved information having the reserved time in a specific period among the reservation information stored in the reservation information file 14 by referring to the network configuration information file 15, and stores the derived path control information into the file 16. The path control information is distributed to each of the nodes 20 by the path control information transmission process routine 133 periodically executed by the network management system 10. One of the features of the invention resides in that each of the nodes stores the path control information having a reserved time in a predetermined period preliminarily distributed from the network management system 10 and, at the reserved time, the header conversion information is switched autonomously in the line interface of the input port indicated by the path control information.

Figure 5:
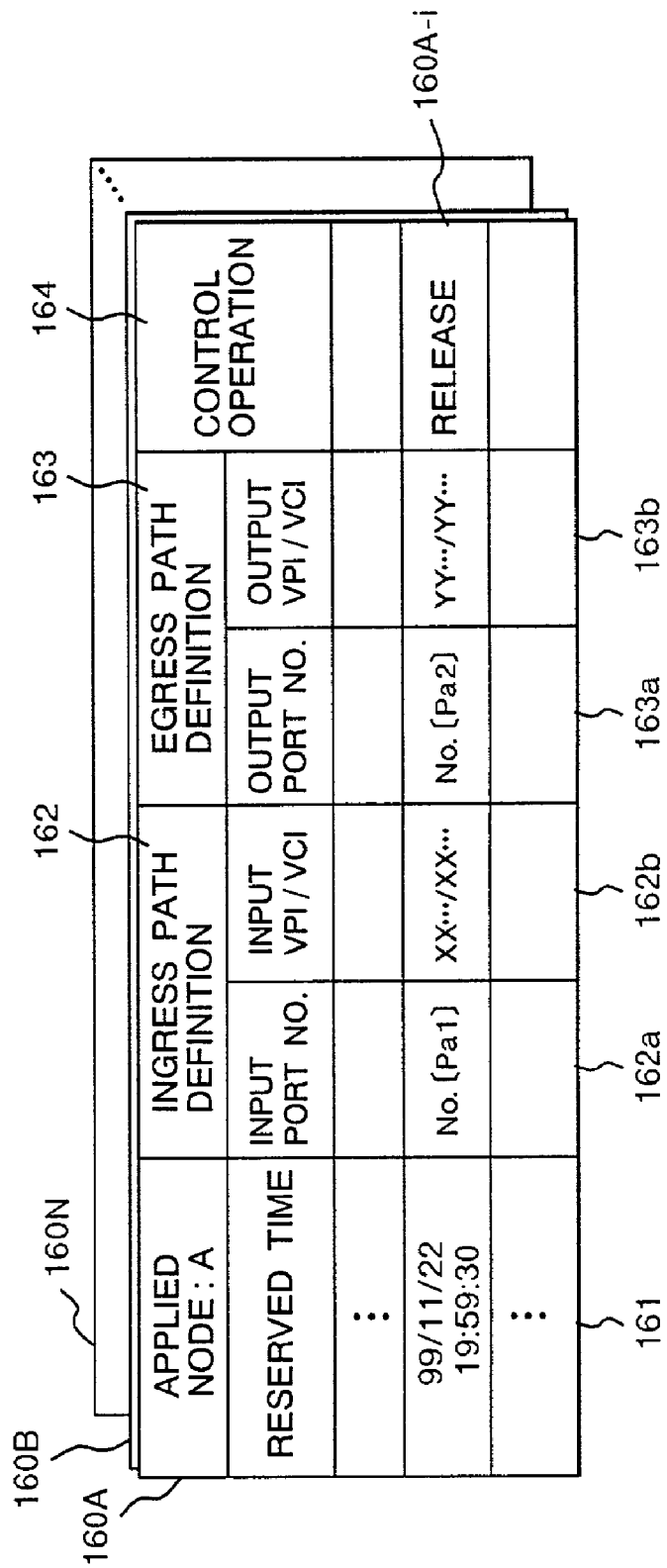
FIG. 5 is a diagram showing an example of a format of path control information stored in a path control information file 16 for each node in the network management system 10.

FIG. 5 shows an example of the format of the path control information for each node.

The path control information for each node is stored in path control tables 160 (160A to 160N) prepared in correspondence with nodes in the file 16. Each table is comprised of a plurality of entries each including a reserved time 161, ingress path definition information 162, egress path definition information 163, and control operation 164. The ingress path definition information 162 includes input port number 162a and input VPI/VCI 162b. The egress path definition information 163 includes output port number 163a and output VPI/VCI 163b.

For example, a reservation information entry 140-i shown in FIG. 3 is developed to path control information for each node as follows. First, with reference to the path definition table 150D of the source station D prepared in the network configuration information file 14, the ingress path definition information 153 (input port number 153a and input VPI/VCI 153b) and the egress path definition information 154 (output port number 154a, output VPI/VCI 154b, and next node input port number 154c) are obtained from an entry 150D-i in which the destination station 151 is the station E. By the obtained input port number 153a, input VPI/VCI 153b, output port number 154a, output VPI/VCI 154b, and reserved time 141 and control operation 144 indicated by the reservation information entry 140-i, a path control information entry is generated and added to the path control table 160D for the station D.

Subsequently, with reference to the path definition table to be applied to a node designated as the next node 152 in the path definition entry 150D-i, an entry in which the station E is defined as the destination station 151 is retrieved. Since the next node of the node D is the node E in the ATM network of FIG. 1, an entry 150E-j in which the destination station 151 is the station E is retrieved from the path definition table 150E corresponding to the node E, and an entry is added to the path control table 160D for the station E.

As the input port number 162a and the input VPI/VCI 162b of the added entry, the next node input port number 154c and the output VPI/VCI 154b in the path definition entry 150D-i are applied. As the output port number 163a and the output VPI/VCI 163b of the added entry, the output port number 154a and the output VPI/VCI 154b indicated by the path definition entry 150E-j are applied.

By storing the reservation information entries in a reservation table 140 in a state sorted in accordance with the reserved time by the reservation receiving process routine 131, the reservation information conversion process routine 132 can read out the reservation information entries having reserved time which is in a predetermined period (time zone) in accordance with the order of reserved time. By repeating the procedure of referring to the path definition table with respect to the reservation information entries read out from the reservation table 140, the path control information entries for each node in accordance with the order of the reservation time are generated and can be added to the corresponding path control table 160.

Figure 6:
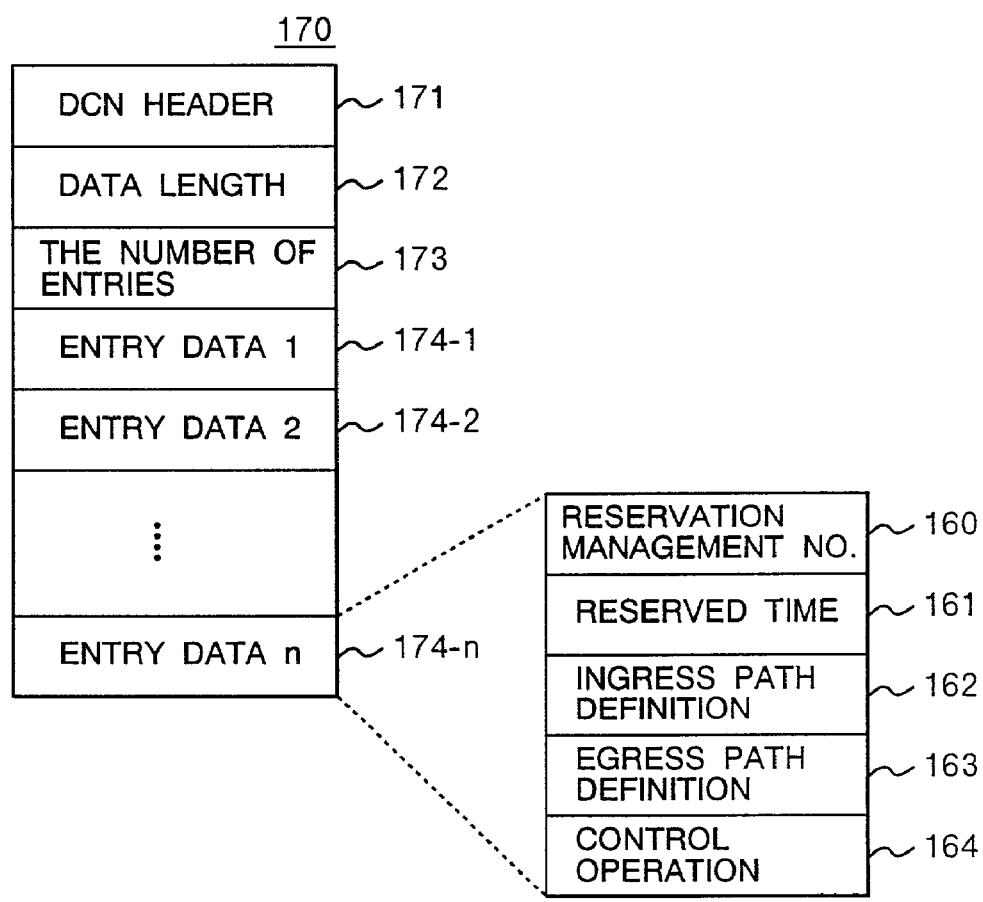
FIG. 6 is a diagram showing an example of a format of a path control information transmission message transmitted from the network management system 10 to each of nodes 20.

The path control information transmission process routine 133 periodically reads out a group of path control information entries from the path control table 160 for each node and transmits them in the form of, for example, a message 170 shown in FIG. 6.

The message 170 is constructed by a DCN header 171, a data length 172 indicative of the length of a data portion subsequent to the DCN header 171, the number of entries 173 indicative of the number of entry data included in the data portion, and entry data 174-1 to 174-n of the number. The DCN header 171 includes the identifier of the message and the identifier of the destination node. Each entry data 174 includes not only path control information (reserved time 161, ingress path definition information 162, egress path definition information 163, and control operation 164) read out from the path control table 160 but also a reservation management number 160.

The path control information transmission process routine 133 sets the path control information entry of which reserved time is within the predetermined period, read out from the path control table 160, together with the reservation management number into the data portion, generates the message 170 using the identifier of the object node of the path control table as the destination node identifier, and transmits the message 170 to the data communication network 100 one after another. By this operation, the path control information for each node is distributed from the network management system 10 to each of the nodes.

Figure 7:
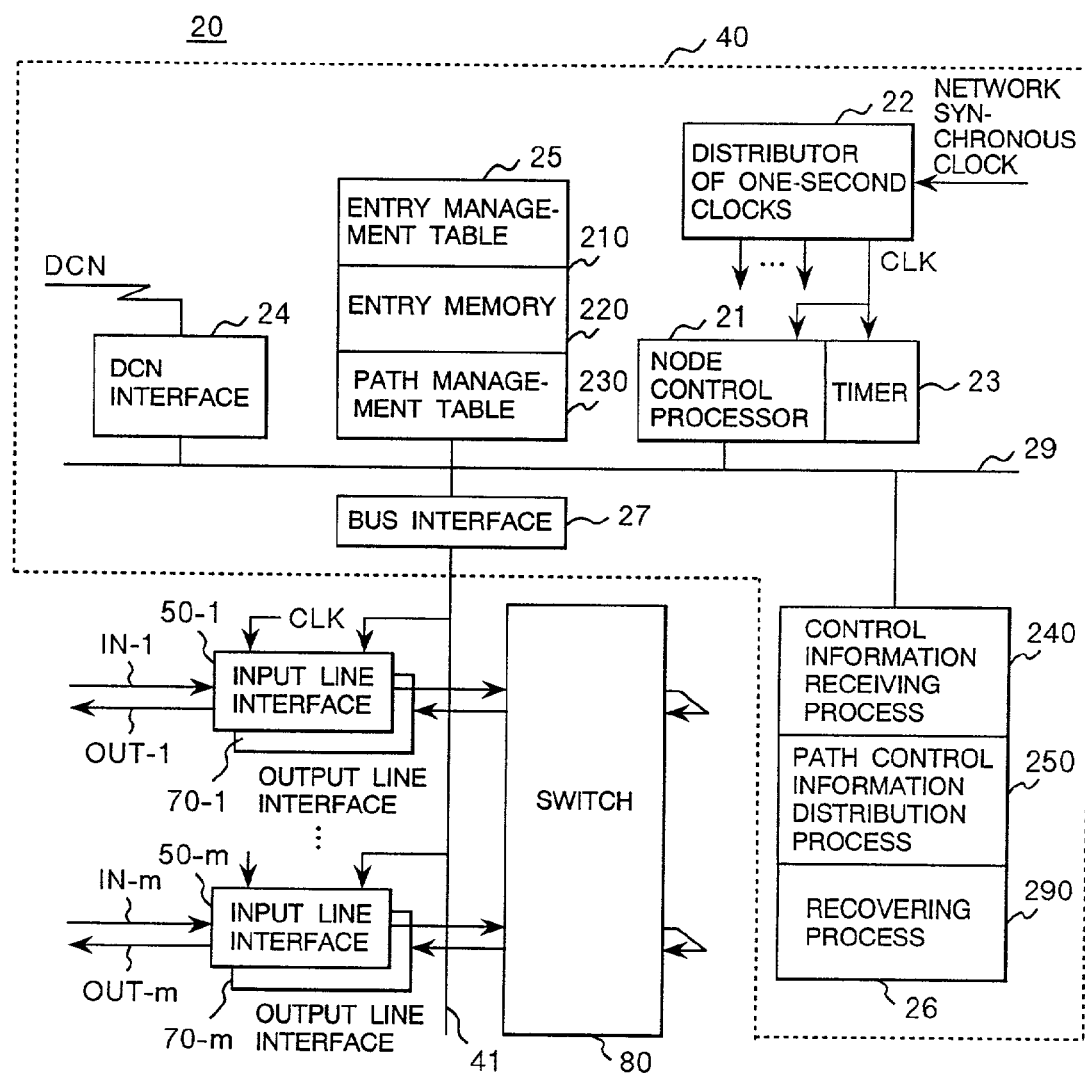
FIG. 7 is a block diagram showing an example of the node 20.

FIG. 7 shows an example of the node 20.

The components of the node 20 are broadly divided into a node control unit 40, input line interfaces 50, output line interfaces 70, and a switch 80.

The node control unit 40 includes a processor (hereinbelow, called a node control processor) 21, a clock distributor 22 for generating clocks CLK every second synchronously with network synchronous clocks and distributing the clocks CLK to the line interfaces in the node, a timer 23 which operates synchronously with the one-second clocks CLK and indicates the current time, a DCN interface 24 connected to the data communication network 100, a data memory 25, a program memory 26, a bus interface 27 connected to a bus 41, and an internal bus 29.

In the data memory 25, an entry management table 210, an entry memory 220, and a path management table 230 which will be described hereinlater are formed. The program memory 26 includes, for example, a control information receiving process routine 240 for registering path control information received in the form of the message 170 from the network management system 10 into the entry management table 210, a path control information distribution process routine 250 for supplying the path control information to each of the input line interfaces, and a recovering process routine 290 for retransmitting the path control information to the input line interface recovered from a failure state.

Each of the input line interfaces 50-i (i=1 to m) is connected between the input port of the switch 80 and an input line IN-i of the ATM cells. Each of the output line interfaces 70-i (i=1 to m) is connected between the output port of the switch 80 and an output line OUT-i. The input line interface 50-i converts the input VPI/VCI of each of the ATM cells received from the input line IN-i to output VPI/VCI, and outputs the ATM cell in a form with internal routing information (output port number) added to the cell header to the input port of the switch 80. The switch 80 transfers the ATM cell received from each input port to an output port indicated by the internal routing information (output port number). The output line interface 70-i removes the internal routing information from each of the ATM cells outputted from the switch 80 and transmits the resultant ATM cells to the output line OUT-i.

The embodiment is characterized in that the node control unit 40 and each of the input line interfaces 50 (50-1 to 50-m) are connected to each other via the bus 41 and, as will be described hereinlater, the path control information is distributed from the node control unit 40 to the input line interfaces 50 at good timings.

Figure 8:
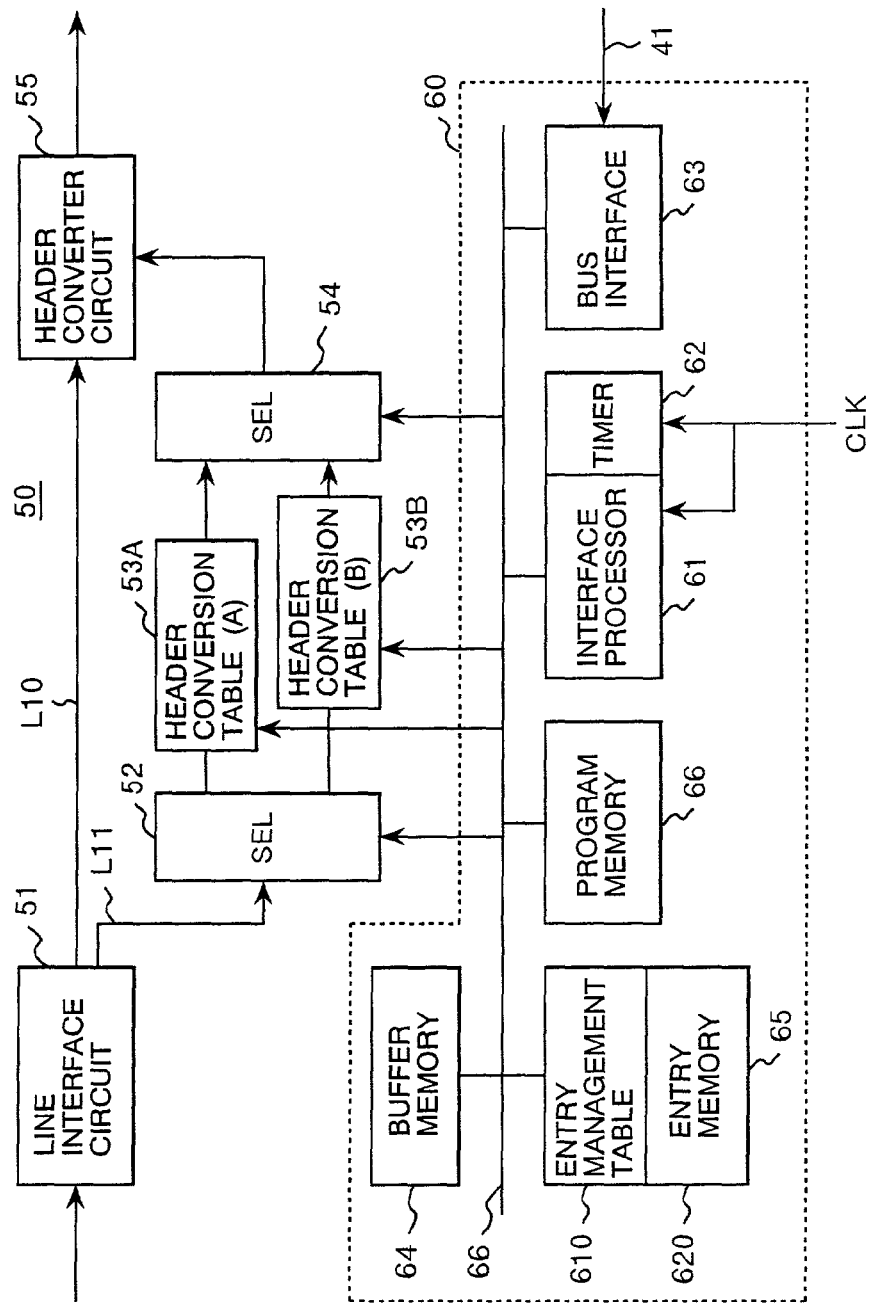
FIG. 8 is a block diagram showing an example of an input line interface 50 included in the node 20.

FIG. 8 shows an example of the input line interface 50.

The input line interface 50 has: an ATM line interface circuit 51 for processing the input signal from an input line IN so as to output ATM cells to a signal line L10 and to output the input VPI/VCI extracted from the cell header to a signal line L11; a first selector 52 connected to the signal line L11; two header conversion tables 53A (A-plane) and 53B (B-plane) connected to the first selector 52; a second selector 54 for selecting an output of either the header conversion table 53A or 53B; a header converter circuit 55 connected to the signal line L10 and the selector 54; and an interface control unit 60.

The interface control unit 60 includes a processor (hereinbelow, called an interface processor) 61, a timer 62 operating synchronously with the one-second clocks CLK and indicating the current time, a bus interface 63 connected to the bus 41, a buffer memory 64 for temporarily storing reception data from the node control unit 40, a data memory 65, a program memory 66 for storing a reserved operation execution process routine 640 which will be described hereinlater by referring to FIG. 14, and an internal bus 66. In the data memory 65, as will be described hereinlater, an entry management table 610 for managing the path control information in accordance with the order of reserved time and an entry memory region 620 in which real data of the path control information entry is stored are formed.

Since each node 20 needs the plurality of input interfaces 50 corresponding to the number of input/output lines, it is desirable to reduce the capacity of each of the memories 64 and 65 required by each of the interface control unit 60 as much as possible in order to provide the node cheaply. In the embodiment, therefore, as the memory 25 in the node control unit 40, a memory having a capacity sufficient to store the path control information of a relatively large amount supplied at a frequency of once or a few times a day from the network management system 10 is employed. From the node control unit 40 to each of the input line interfaces 50, the path control information is loaded little by little frequently at short intervals so that the memory capacity of the interface 50 may be small. For example, when the node control processor 21 executes the path control information distribution process routine 250 every second, finds a path control information entry with the reserved time in T minutes hence (T×60 seconds) and loads the entry to the input line interface 50-i corresponding to the input port number (i) indicated by the entry, it is sufficient for the memory in each input line interface to store the path control information entry of a relatively small amount, with the reserved time in the T minutes hence.

In the input line interface 50 shown in FIG. 8, the header conversion tables 53A and 53B are directly accessed with the input VPI/VCI. In a practical application, for example, a CAM for converting the input VPI/VCI to a table address may be disposed at the front stage of the selector 52, and the header conversion tables 53A and 53B may be accessed with the address outputted from the CAM. It is also possible to form the two header conversion tables 53A and 53B on the same memory and switch the table region to be accessed by switching the most significant bit in the memory address.

Figure 9:
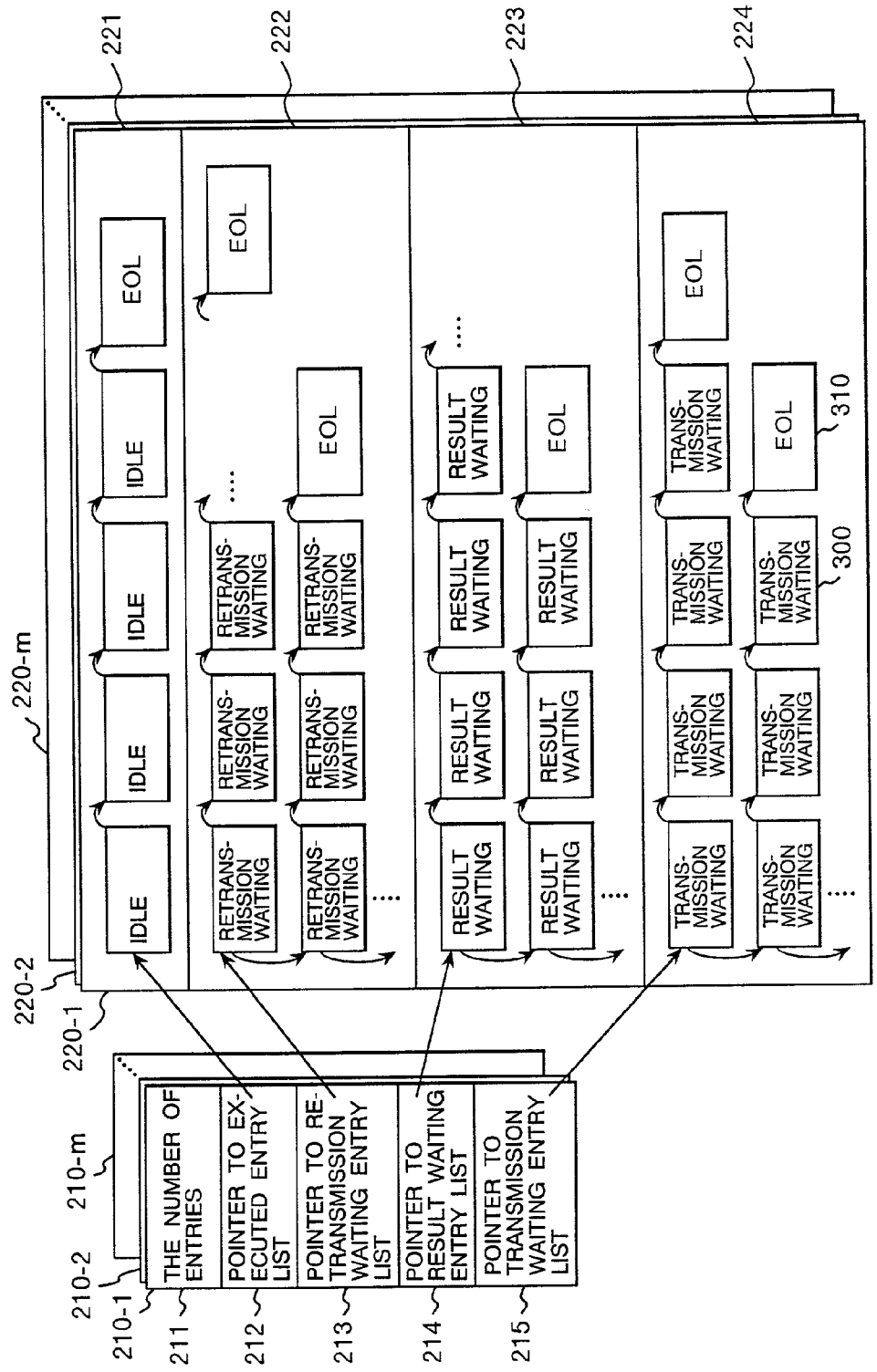
FIG. 9 is a diagram showing an example of a format of an entry management table 210 of a node control unit 40 included in the node 20 and a storage format of a path control information entry 300 in an entry memory 220.

FIG. 9 shows an example of the configuration of the entry management table 210 formed in the memory 25 of the node control unit 40 and the storage format of the path control information entries in the entry memory region 220.

The node control unit 40 registers the path control information entry received by the message 170 from the network management system 10 into the entry management table 210-i (i=1 to m) prepared for each input line interface, and performs an entry management in accordance with a reservation execution state.

Each of the entry management tables 210-i is comprised of the number 211 of idle entries, a pointer 212 to an executed (idle) entry list, a pointer 213 to a retransmission waiting entry list, a pointer 214 to a result waiting entry list, and a pointer 215 to a transmission waiting entry list. The entry memory region 220 is divided into a plurality of sub regions 220-i (i=1 to m) corresponding to the input line interfaces. The path control information entries are linked to the order of reserved time in accordance with the execution states in each of the sub regions, thereby forming entry lists 221 to 224 by state.

The number 211 of idle entries in the entry management table 210-i indicates the number of entries in an idle state linked to the idle entry list 221 in each sub region, and the pointers 212 to 215 indicate entries located at the head of the corresponding entry lists. The path control information entry received from the network management system 10 is linked to the transmission waiting entry list 224 in accordance with the order of reserved time by the control information receiving process routine 240.

Figure 10:
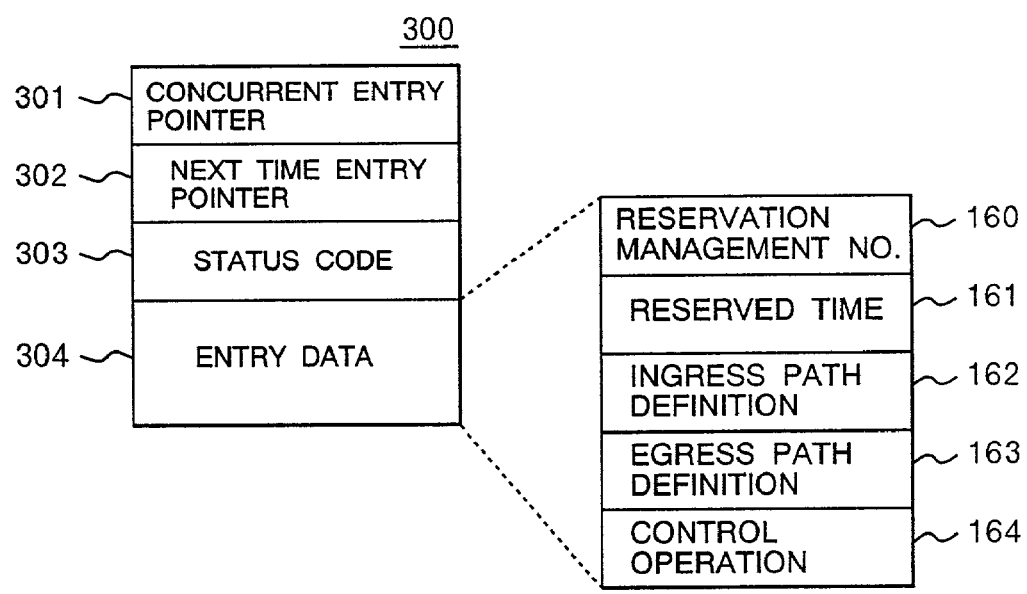
FIG. 10 is a diagram showing an example of the structure of the path control information entry 300 stored in the entry memory 220.

Each path control information entry 300 registered in the entry memory 220-i is comprised of, as shown in FIG. 10, a concurrent entry pointer 301, a next time entry pointer 302, a status code 303, and entry data 304.

The status code 303 indicates the status of the entry, which is a transmission waiting status, result waiting status, retransmission waiting status, or executed (idle) status. In the entry data 304, the contents of the entry data 174 (reservation management number 160, reserved time 161, ingress path definition information 162, egress path definition information 163, and control operation 164) included in a reception message from the network management system 10 are set.

The concurrent entry pointer 301 is used to form a concurrent entry list by linking a plurality of entries having the same reserved time. The next time entry pointer 302 indicates the head entry in the next concurrent entry list. Therefore, the transmission waiting entry list 224 is constructed by a plurality of concurrent entry lists linked in accordance with the order of the reserved time. The last entry in each concurrent entry list is an EOL (End of List) entry 310 indicative of the last of the list. In a manner similar to the transmission waiting entry list 224, each of the retransmission waiting entry list 222 and the result waiting entry list 223 is constructed by a plurality of concurrent entry lists linked in accordance with the order of reserved time.

The path control information entry 300 registered in the transmission waiting entry list 224 is transmitted to the input line interface 50-i indicated by the input port number of each entry by the path control information distributing process routine 250 which will be described hereinlater, T minutes (for example, T=3) before the reserved time. The entry successfully transmitted is transferred to the result waiting entry list 223. For example, due to a failure in the destination input line interface 50-i or no board, the path control information entry which does not succeed in being transmitted is transferred to the retransmission waiting entry list 222.

On receipt of an execution completion notification from the input line interface 50-i, the path control information entry linked to the result waiting entry list 223 is transferred to the idle entry list 221. Retransmission of the entry linked to the retransmission waiting entry list 222 is repeated until the reserved time, and the entry succeeded in being transmitted is transferred to the result waiting entry list 223. The entry which has not succeeded in being retransmitted by the reserved time is registered as a reservation failed entry in the path management table 230. The corresponding entry in the entry memory 220 is moved to the idle entry list 221.

On the other hand, in each input line interface 50-i, the path control information entry supplied from the node control unit 40 is stored in the entry memory 620 and is managed by the entry management table 610 in accordance with the order of reserved time.

Figure 11:
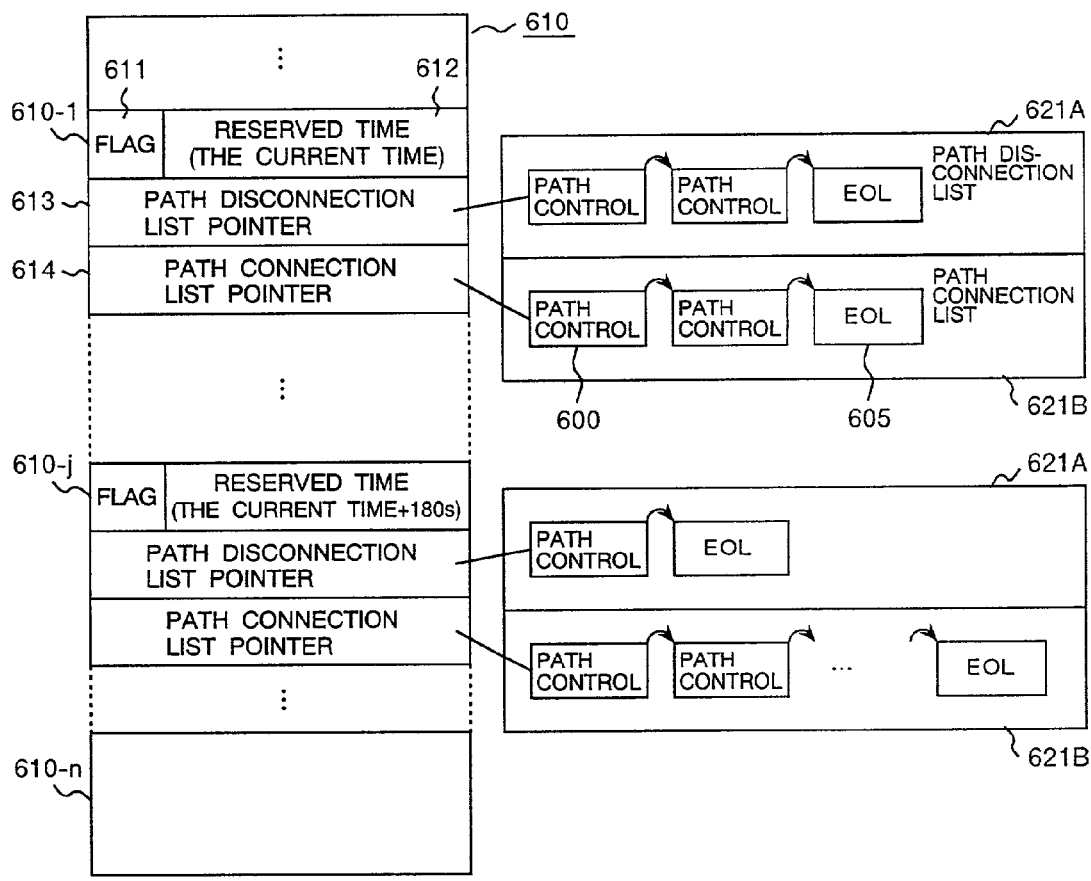
FIG. 11 is a diagram showing an example of a format of an entry management table 610 of the input line interface 50 and a storage format of a path control information entry 600 in an entry memory 620.

The entry management table 610 of the input line interface includes, for example, as shown in FIG. 11, a plurality of management entries 610-1 to 610-n. Each management entry has a validity indicating flag 611 indicating whether the management entry is a valid entry (status "1") or an idle entry (status "0"), a reserved time 612, a path disconnection list pointer 613, and a path connection list pointer 614.

In the entry management table 610, valid management entries are arranged in accordance with the order of reserved time. The management entry having a past reserved time is sequentially erased from the entry management table 610 by clearing the flag 611 to "0". Among the valid entries remaining in the entry management table 610, the reserved time 612 of the first management entry 610-1 is closest to the current time, and the last valid management entry 610-j has the reserved time in T minutes hence.

A management entry is registered in the entry management table 610 by circulatingly using the table region. When entry data is registered in the last entry region 610-n, the next entry data is registered in the first region 610-1 which is already in an idle status. The head of the group of valid entries is designated by, for example, the valid entry pointer.

According to the embodiment, the small number of path control information entries 600 related to a path to be connected or disconnected within T minutes are stored in the entry memory 620. These entries are managed in accordance with the reserved time and the control operation by the entry management table 610. Specifically, the plurality of control information entries 600 having the same reserved time are grouped for a path disconnection and a path connection in accordance with the contents of the control operation 164. The control information entries instructing the disconnection of the path are linked to each other to thereby form a path disconnection list 621A. The control information entries instructing the connection of the path are linked to each other to thereby form a path connection list 621B. The head entry of the path disconnection list 621A and that of the path connection list 621B having the same reserved time are designated by the path disconnection list pointer 613 and the path connection list pointer 614, respectively, in the management entry 610-i, and the last entry in each of the lists is the EOF entry.

Each of the path control information entries 600 stored in the entry memory 620 is constructed by the concurrent entry pointer and entry data. In this case, the entry data includes at least the reservation management number 160, the ingress path definition information 162, and the egress path definition information 163. Since the reserved time is known from the management entry 610, it may be omitted from the entry data. Similarly, the control operation can be identified from the lists 621A and 621B to which each of the control information entries belongs, so that it can be omitted from the entry data. The operation of registering the path control information entry received from the node control unit 40 to the entry memory 620 and the path connecting/disconnecting control according to the path control information are performed by the reserved operation execution process routine 640 which will be described by referring to FIG. 14.

Figure 12:
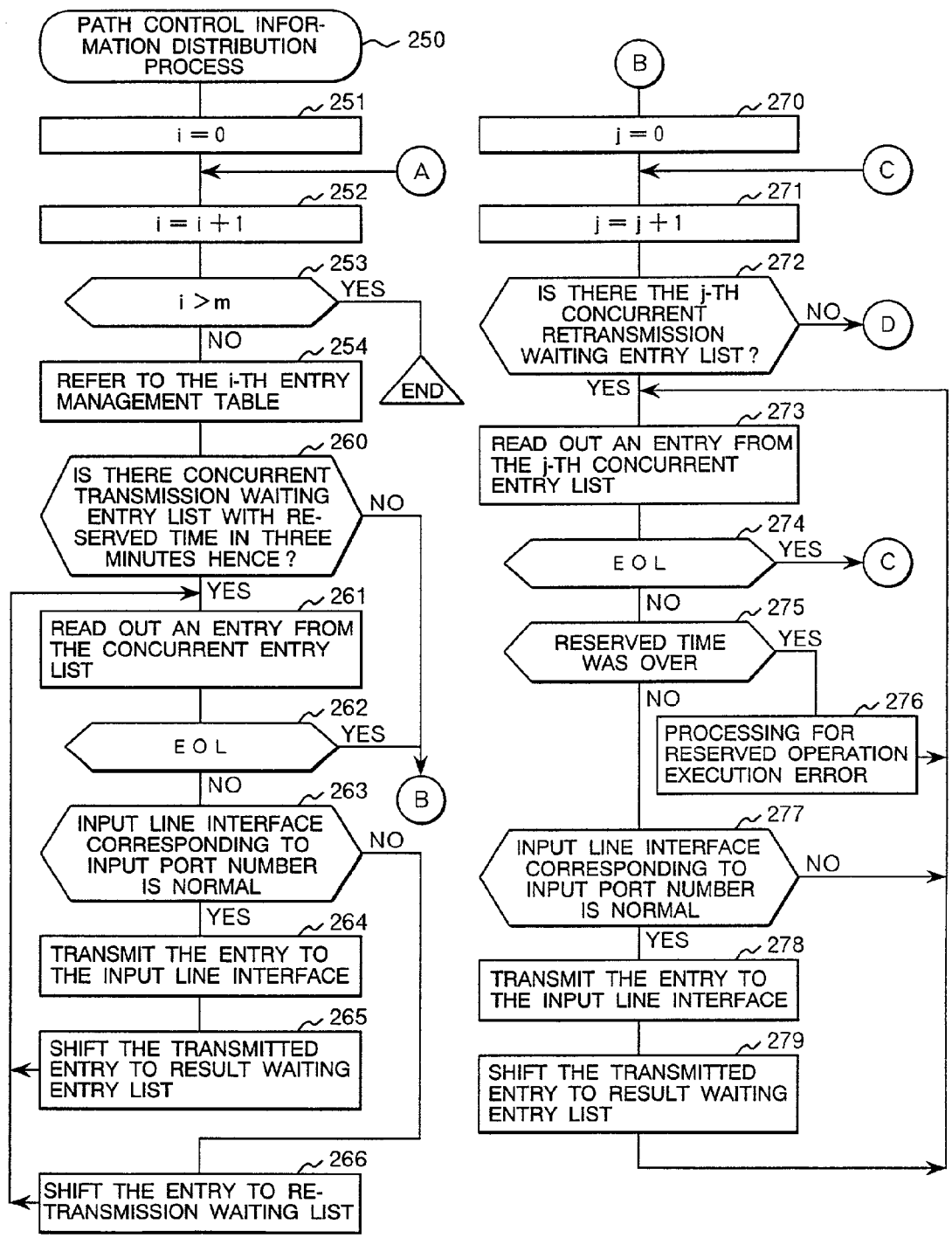
FIG. 12 is a flowchart showing an embodiment of a path control information distribution processing routine 250 executed by the node control unit 40.
Figure 13:
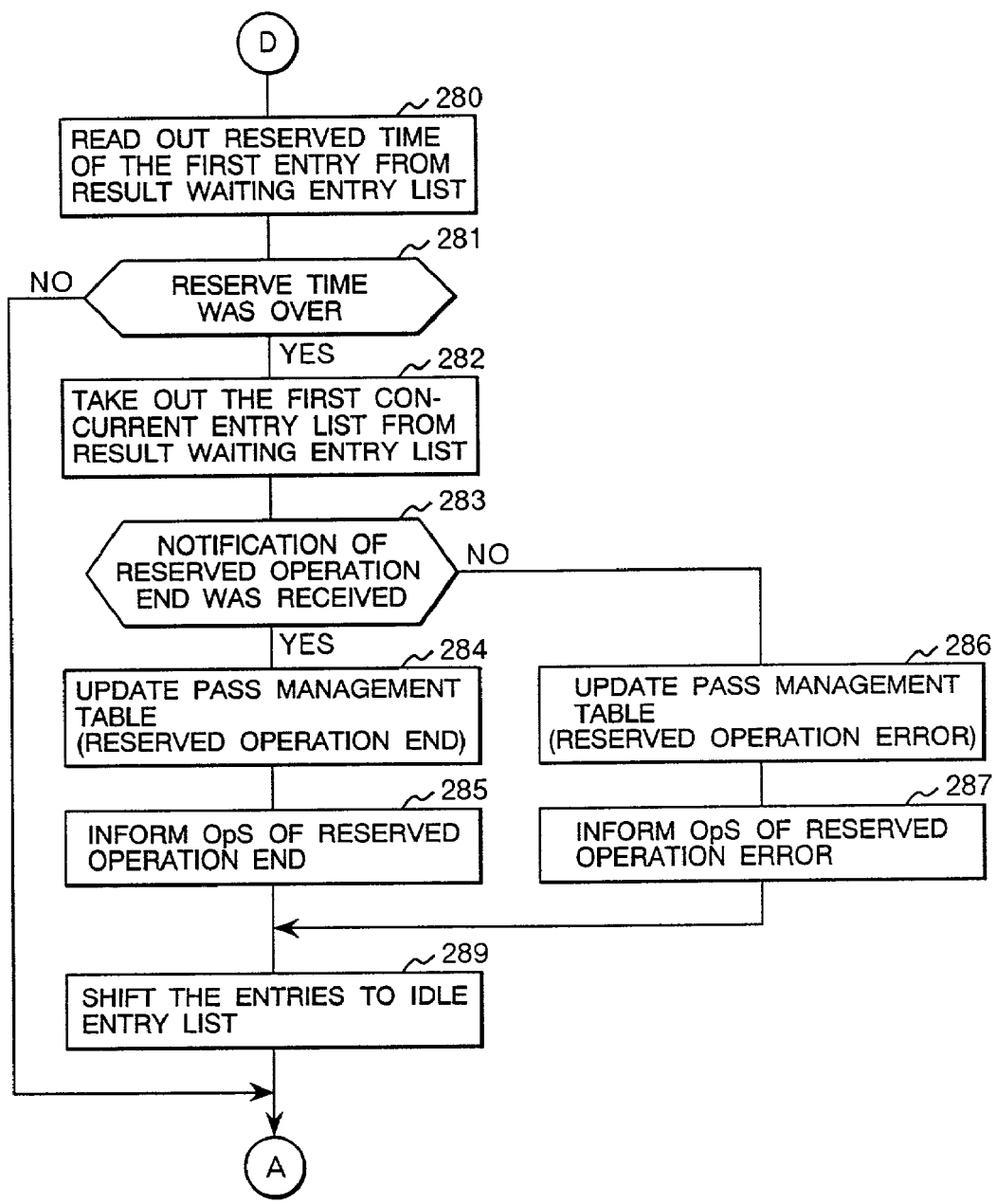
FIG. 13 is a flowchart showing the rest of the path control information distribution processing routine 250 shown in FIG. 12.

FIGS. 12 and 13 show a flowchart of the path control information distribution process routine 250 executed every second by the processor 21 synchronously with the clock signal CLK generated from the distributor 22 of one-second clocks in the node control unit 40.

In the path control information distribution process routine 250, the value of a parameter "i" for specifying one (210-i) of the entry management tables 210-1 to 210-m is initialized to 0 (step 251). After that, the value of the parameter "i" is incremented (252), and whether the parameter "i" exceeds the maximum value "m" or not is determined (253). If the value of the parameter "i" is smaller than "m", the following processes are executed by referring to the i-th entry management table 210-i. At the time point when the value of the parameter "i" becomes larger than "m" (i>m), the path control information distributing process has been completed with respect to all of the entry management tables. Consequently, the routine 250 is finished.

When the value of the parameter "i" is equal to or smaller than "m", first, according to the pointer 215 to the entry management table 210-i, the head entry of the transmission waiting entry list 224 is referred to (step 254) and the reserved time 161 of the entry is compared with the current time indicated by the timer 23, thereby determining whether or not the head entry is a transmission waiting entry with the reserved time in three minutes hence (260). When the reserved time of the entry is later than "current time+three minutes", the program sequence advances to step 270. When the reserved time of the entry is just three minutes after the current time, the transmission waiting entries are sequentially read out from the head of the transmission waiting entry list of the same time (261). When the read entry is EOL (262), the program sequence advances to step 270.

When the read entry is the transmission waiting entry, an input line interface 50-k as a data transmission destination is specified from an input port number "k" included as the input path definition information 162 in the entry, and whether the input line interface 50-k is normally operating or not is determined (263). The operating status of each of the input line interfaces 50 is always monitored by the bus interface 27. Whether the input line interface 50-k is normal or not is determined by, for example, referring to a line interface status table (not shown).

If the input line interface 50-k is normal, the entry data is transmitted to the interface (264), the status code 303 of the transmitted entry is updated to a result waiting status, and a link destination is changed to the result waiting entry list 223 (265). After that, the program sequence returns to step 261 and similar operations are repeated on the next entry. If the input line interface 50-k is faulty, the link destination of the entry is changed to the retransmission waiting entry list 213 (266) and the program sequence returns to step 261.

In step 270, the value of a parameter "j" for specifying one of the concurrent entry lists forming the retransmission waiting entry list 222 is initialized to zero. After that, the value of the parameter "j" is incremented (271) and the j-th concurrent time entry list is referred to (272). If the j-th concurrent entry list does not exist, the program sequence advances to step 280 in FIG. 13. When the j-th concurrent entry list exists, the retransmission waiting entries are sequentially read out from the head of the list (273). When the read entry is an EOL (274), the program sequence returns to step 271 where the parameter (j) is incremented and similar processes are repeated on the next concurrent entry list in a retransmission waiting state.

If the read entry is not an EOL, the reserved time 161 of the entry and the current time are compared with each other to determine whether the reserved time has passed or not (275). When the reserved time has passed, a processing for a reserved operation execution error is executed (276). In the processing 276 for a reserved operation execution error, a code indicative of a "reserved operation execution error (data transmission failure)" is set as the status code 303 of the entry, the entry is registered in the path management table 230, and a notification of an error of the reserved operation execution including the entry data is transmitted to the network management system 10. After executing the processing for a reserved operation execution error (276), the program sequence returns to step 273. The processing for a reserved operation execution error (276) is similarly repeated on the remaining entries in the j-th concurrent entry list. Alternately, the error notifications to the network management system 10 can be sent at once in the form of a message for all of the entries in the j-th concurrent entry list having the past reserved time.

When the reserved time of the read entry has not been past, an input line interface 50-k as a data transmission destination is specified from the input port number (k), and whether the input line interface 50-k is normally operating or not is determined (277). If the input line interface 50-k is normal, in a manner similar to steps 264 and 265, the entry data is transmitted to the interface (278), the status code 303 of the transmitted entry is updated, the link destination is shifted to the entry list 223 (279), and the program sequence returns to step 273. If the input line interface 50-k is still faulty, the program sequence returns to step 277 without performing any operation, and similar operations are repeated on the next entry.

When the processes in steps 272 to 279 are finished on all of the retransmission waiting entries, in step 280 in FIG. 13, the reserved time of the head entry in the result waiting entry list 223 is read out and compared with the current time to determine whether the reserved time has passed or not (281).

In the invention, as will be described hereinlater in FIG. 14, the input line interface 50 executes the designated path control operation at the reserved time, and notifies the node control unit 40 of the reserved operation end. At a time point after the reserved time of the head entry of the result waiting entry list 223 has passed, the node control unit 40 takes out the first concurrent entry list (282), and a check is made to see whether the notification of the reserved operation end has been received or not with respect to each of the entries in the list (283). If the reserved time of the head entry has not passed (281), the notification of the reserved operation end has not been received yet from the input line interface.

Consequently, the program sequence returns to step 252 in FIG. 12, and the above-described processes are repeated on the next entry management table.

If the notification of the reserved operation end has been received, the code indicative of "reserved operation has been completed" is set as the status code 303 of the entry. After that, the code is registered in the path management table 230 (284), and the network management system 10 is notified of the completion of the reserved operation (285). On the other hand, with respect to the entry of which the notification of the reserved operation end has not been received from the input line interface, it is determined that the operation of controlling the input line interface is faulty. The code indicative of "reserved operation execution error (no response)" is set as the status code 303 of the entry and is registered in the path management table 230 (284), and the reserved operation execution error is notified to the network management system 10 (285). After that, the status code 303 is updated to an idle status with respect to each entry of which the status has been notified to the network management system 10, and the entry is shifted to the idle entry list 221 (289). After that, the program sequence returns to step 252 in FIG. 12, and the above-described processes are repeated on the next entry management table.

According to the path control information distribution process routine 250, the path control information entry, which could not be transmitted to the input line interface T minutes before the reserved time, is treated as the retransmission waiting entry and is repeatedly tried to retransmit until the reserved time. If a failure is recovered before the reserved time, therefore, the path control information entry can be loaded to the input line interface. The path control information entry of which reserved time is past in the retransmission waiting state is shifted to the path management table 230. These path control information entries are processed by the recovering process routine 290 on recovery from the failure in the input line interface and are selectively loaded from the path management table to the input line interface.

Figure 14:
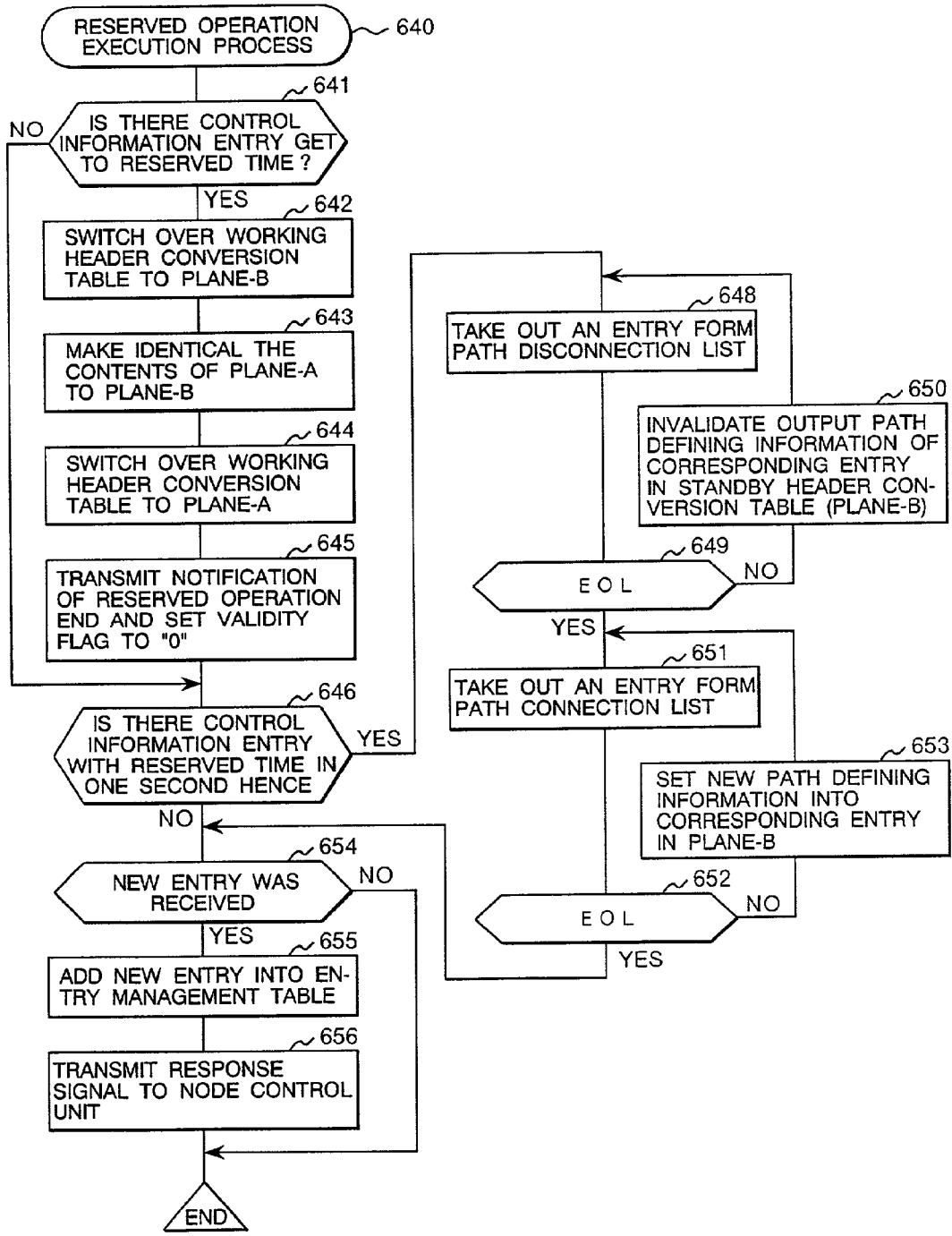
FIG. 14 is a flowchart showing an example of a reserved operation execution processing routine 640 executed by the input line interface 50.

FIG. 14 is a flowchart of the reserved operation execution process routine 640 to be executed every second by the interface processor 61 synchronously with the clock signal CLK in each of the input line interfaces 50.

In the reserved operation execution process routine 640, first, the reserved time 612 is read out from the first valid management entry 610-1 in the entry management table 610 and is compared with the current time indicated by the timer 62, thereby determining whether or not there is a control information entry (the path disconnection list or path connection list) with reserved time equal to the current time (step 641). If there is no control information entry with reserved time equal to the current time, the program sequence advances to step 646.

If the reserved time 612 in the first valid management entry 610-1 coincides with the current time, the selectors 52 and 54 are switched over so as to use the standby header conversion table (B-plane) 53B as a working plane (642). As will be described hereinlater, the contents of the header conversion table (B-plane) have already been updated according to the path control information entry registered in the path disconnection list 621A and the path connection list 621B one second before the reserved time.

In a state where the working plane has been switched over to the standby header conversion table (B-plane) 53B, the contents of the other header conversion table (A-plane) 53A are updated so as to be identical with those of the header conversion table (B-plane) 53B (643). In this case, the path disconnection list 621A and the path connection list 621B are accessed on the basis of the management entry 610-1 of which reserved time is the current time in the entry management table 610, and the contents of the A-plane are updated in accordance with the path control information entry linked to the lists. The contents of the header conversion table 53B may be copied to the table 53A.

After completion of the updating of the contents of the header conversion table (A-plane) 53A, the selectors 52 and 54 are switched over so as to use the header conversion table (A-plane) 53A as the working plane (645). At this time point, the control operation of connecting and disconnecting the reserved path has been completed. Accordingly, notifications of the reserved operation end with respect to the path definition information entries 600 linked to the path disconnection list 621A and the path connection list 621B are generated and transmitted to the node control unit 40 (645). At this time, the validity flag 611 in the useless management entry 610-1 is set to an invalid status ("0"), the path definition information entries linked to the path disconnection list 621A and the path connection list 621B corresponding to the management entry 610-1 are released as idle entries, and a valid entry pointer is updated to the address of the next management entry. By the operation, a new management entry having the next reserved time becomes the first valid management entry 610-1 in the entry management table 610.

In the next step 646, the reserved time 612 of the first valid management entry 610-1 in the entry management table 610 is compared with the current time to determine whether there is a control information entry with reserved time in one second hence (step 646).

If the reserved time 612 is later than "current time+1 second", the program sequence advances to step 654. If the reserved time 612 coincides with "current time+1 second", an entry is taken out from the path disconnection list 621A in accordance with the path disconnection list pointer 613 to the valid management entry 610-1 (648). When the taken entry is the path control information entry 600, output path defining information of the corresponding entry in the standby header conversion table (B-plane) 53B is invalidated (650), and the program sequence returns to the step 648 where the next entry is taken out from the path disconnection list 621A.

Since output VPI/VCI and output port number are stored in the header conversion table 53B as an entry corresponding to input VPI/VCI extracted from the header of each of ATM cells, in the step 650, the header conversion table (B-plane) 53B is accessed on the basis of the input VPI/VCI included in the input path defining information 162 in the extracted path control information entry 600, and the output VPI/VCI and the output port number which have been already registered are erased or replaced with invalid data.

By repeating the processes in steps 648 to 650 until the EOL 605 of the path disconnection list 621A is read out (649), the updating of the standby header conversion table can be completed one second before the reserved time with respect to all of the path control information entries linked to the path disconnection list 621A.

When the EOL is read out from the path disconnection list 621A, an entry is taken out from the path connection list 621B in accordance with the path connection list pointer 614 of the valid management entry 610-1 (651) If the taken entry is the path definition entry 600, the header conversion table 53B is accessed on the basis of the input VPI/VCI included in the input path definition information 162 of the entry, and the output VPI/VCI and the output port number designated as the output path definition information 163 in the path definition entry 600 are written (653).

By repeating the processes in the steps 651 to 653 until the EOL 605 in the path connection list 621B is read out (652), the updating of the standby header conversion table can be completed one second before the reserved time with respect to all of the path control information entries linked to the path connection list 621B.

When the EOL is read out from the path connection list 621B, the program sequence advances to step 654 and whether or not a new entry is received in the buffer memory 64 from the node control unit 40 is determined. When a new entry is received, a new management entry 610-(j+1) is added into the entry management table 610 and the received entries are grouped in accordance with the contents of their control operations 164, thereby registering the received entries as the new path disconnection list 621A or path connection list 621B linked to the management entry into the entry memory 620 (655). After that, a response signal indicative of completion of the setting of the received entry to the management table is transmitted to the node control unit 40 (656), and the execution of the routine 640 is finished.

According to the embodiment, the path control information of each node is distributed in advance from the network management system 10 to the plurality of nodes 20, and the control unit 40 in each node distributes a path control information entry with reserved time in T seconds (T=180) hence to the input line interface 50-i by the reserved information distribution processing routine 250 executed periodically, for example, every second. Consequently, the memory for storing the path control information of the input line interface can have a relatively small capacity.

The clock in the node control unit 40 and that in each of the input line interfaces 50-i are operated by the clock signal CLK synchronized with the network synchronous clock. Each input line interface 50-i updates the standby header conversion table (B-plane) just before the reserved time indicated by the path control information entry distributed from the node control unit, and the working table is switched over to the standby header conversion table at the reserved time. Therefore, even when a number of paths to be controlled at the same time occur in one node, the setting and releasing of the path can be executed at the reserved time without a delay.

Thus, in the case where the configuration of the nodes is applied to the digital TV signal relay network shown in FIG. 1, the video distribution paths among the broadcasting stations distributed in various places in the country can be instantaneously switched at predesignated time.

As obviously understood from the above description, according to the invention, a communication path can be instantaneously set, released, or switched synchronously with the predesignated time in a plurality of nodes constructing the communication network. By applying the invention, therefore, a digital TV relay network capable of broadcasting a TV video signal being broadcasted in an arbitrary broadcasting station also from another specific station at a designated time can be constructed by using the ATM network.

What is claimed is:

1. A communication network system, comprising:
a plurality of nodes constructing an ATM network;
a network management system connected to said plurality of nodes via a data communication network; and
a plurality of terminal apparatuses for transmitting path connection control reservation information designating a path to be continued, control operation, and execution time, to said network management system.
wherein said network management system includes means for generating path control information for each node located on a path indicated by the reservation information based on network configuration information and the path connection control reservation information received from said terminal apparatus, and means for distributing the path control Information with execution time being in a predetermined period in a lump to a corresponding node, and
wherein each of said nodes includes means for storing the path control information distributed in advance from said network management system, timer means operating synchronously with a network synchronous clock of said data communication network, and means for comparing a current time indicated by said timer with the execution time indicated by each of said path control information and executing a designated path connection controlling operation at a designated time
wherein each of said nodes comprises:
a plurality of input/output line interfaces connected to input/output lines of ATM cells,
an ATM switch connected to said plurality of input/output line interfaces, and
a node control unit connected to said data communication network and each of said input line interfaces,
wherein said node control unit comprises:
means for storing path control information distributed from said network management system, and
means for selecting path control information having a designated execution time which will get to a current time within a predetermined time among said path control information, and supplying the selected path control information to said input line interface, and
wherein each of said input line interfaces comprises:
means for storing path control information supplied from said node control unit, and
means for selectively switching header conversion information of input ATM cells at the designated execution time based on the path control information stored in said storing means.

2. A method for synchronously controlling path connection in a communication network system which includes a plurality of nodes constructing an ATM network, a network management system connected to said plurality of nodes via a data communication network, and a plurality of terminal apparatuses connected to said data communication network, said method comprising the steps of:
transmitting path connection control reservation information designating a path to be controlled, a control operation, and an execution time from any of said terminal apparatuses to said network management system;
generating path control information for each node located on a designated path based on the path connection control reservation information for each path received from the terminal apparatus and distributing the path control information with execution time being in a predetermined period in a lump to a corresponding node by said network management system; and
storing the path control information distributed in advance from said network management system and executing a designated path connection controlling operation at a designated time by each of said nodes, wherein each of said nodes comprises:

a plurality of input/output line interfaces connected to input/output lines of ATM cells, an ATM switch connected to said plurality of input/output line interfaces, and a node control unit connected to said data communication network, wherein said node control unit selectively supplies to said input line interfaces, path control information having a designated time which will become equal to a current lime within a predetermined time, and wherein each of said input line interfaces selectively switches header conversion information of ATM cells on a designated path at a designated time based on the path control information supplied from said node control unit.

3. The method for synchronously controlling path connection according to claim 2, wherein each of said input line interfaces has first and second header conversion tables and control means for switching header conversion information in predetermined processing cycles, and wherein said control means switches a table used for converting the header of input ATM cells from the first header conversion table to the second header conversion table of which contents have been updated in the previous processing cycle, updates the contents of said first header conversion table to those of said second header conversion table, after that, switches back said second header conversion table to said first header conversion table, and updates the contents of said second header conversion table based on path control information having a designated time which will become equal to a current time in the next processing cycle.

4. The method for synchronously controlling path connection according to claim 2, wherein each of said nodes indicates a current time synchronously with a network synchronous clock in said data communication network or ATM network and executes said path connection control operation.

5. The method for synchronously controlling path connection according to claim 3, wherein each of said nodes indicates a current time synchronously with a network synchronous clock in said data communication network or ATM network and executes said path connection control operation.

6. The method for synchronously controlling path connection according to claim 2, wherein said communication network system includes a plurality of broadcasting station devices accommodated by any of said nodes, and said terminal apparatus designates said path by using identification information of a transmission side broadcasting station and a destination side broadcasting station.

7. The method for synchronously controlling path connection according to claim 3, wherein said communication network system includes a plurality of broadcasting station devices accommodated by any of said nodes, and said terminal apparatus designates said path by using identification information of a transmission side broadcasting station and a destination side broadcasting station.

* * * * *

UNITED STATES PATENT AND TRADEMARK OFFICE
CERTIFICATE OF CORRECTION

PATENT NO. : 7,035,264 B2
APPLICATION NO. : 09/796615
DATED : April 25, 2006
INVENTOR(S) : T. Seki et al.

It is certified that error appears in the above-identified patent and that said Letters Patent is hereby corrected as shown below:

On the Title Page, Item (73) Assignee should read
--     (73)    Assignees: Hitachi, Ltd., Tokyo (JP);
                             NTT Communications Corporation, Tokyo (JP) --

Signed and Sealed this

Eighteenth Day of September, 2007

JON W. DUDAS
*Director of the United States Patent and Trademark Office*